(12) United States Patent
Sato

(10) Patent No.: US 10,055,824 B2
(45) Date of Patent: Aug. 21, 2018

(54) IMAGE CORRECTION DEVICE, IMAGE CORRECTION METHOD AND STORAGE MEDIUM

(71) Applicant: NEC Corporation, Minato-ku, Tokyo (JP)

(72) Inventor: Akari Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 15/127,483

(22) PCT Filed: Jan. 7, 2015

(86) PCT No.: PCT/JP2015/000031
§ 371 (c)(1),
(2) Date: Sep. 20, 2016

(87) PCT Pub. No.: WO2015/145917
PCT Pub. Date: Oct. 1, 2015

(65) Prior Publication Data
US 2017/0132765 A1    May 11, 2017

(30) Foreign Application Priority Data
Mar. 28, 2014   (JP) ................. 2014-067595

(51) Int. Cl.
*G06T 5/00*    (2006.01)
*G06K 9/46*    (2006.01)
*G06T 7/90*    (2017.01)

(52) U.S. Cl.
CPC ............ *G06T 5/008* (2013.01); *G06K 9/4652* (2013.01); *G06K 9/4661* (2013.01); *G06T 5/001* (2013.01);
(Continued)

(58) Field of Classification Search
CPC ......... G06T 5/007–5/009; G06T 5/001; H04N 5/23229; H04N 5/5235; G06K 9/465; G06K 9/24661
See application file for complete search history.

(56) References Cited

U.S. PATENT DOCUMENTS 7,619,652 B2   11/2009 Oizumi
7,705,919 B2    4/2010 Suzuki et al.
(Continued)

FOREIGN PATENT DOCUMENTS

JP    2002-262303 A    9/2002
JP    2006-004124 A    1/2006
(Continued)

OTHER PUBLICATIONS

"A Spatial Processor Model for Object Colour Perception", by G. Buchsbaum, Journal of the Franklin Institute, Jul. 1980, vol. 310, Issue 1, pp. 1-26.
(Continued)

*Primary Examiner* — Sean Motsinger

(57) ABSTRACT

This invention discloses an image-correcting device that allows stable identification of a target object in a taken image even if the intensity of illumination is uneven across the areas of a space being imaged. The image-correcting device has a reference-luminance-correction-parameter computation unit and a correction unit. The reference-luminance-correction-parameter computation unit computes a reference luminance-correction parameter on the basis of the following: luminance information for the region of a reference image, which is an image taken of a reference object moving through the space being imaged, in which the reference object is displayed; and coordinate information indicating the position of the region. On the basis of the reference-luminance-correction parameter, the correction (Continued)

unit corrects the abovementioned taken image, which is an image taken of the aforementioned space and contains a correction target.

9 Claims, 11 Drawing Sheets

(52) U.S. Cl.
CPC ...... *G06T 7/90* (2017.01); *G06T 2207/10024* (2013.01)

(56) References Cited

U.S. PATENT DOCUMENTS

| | | | |
|---|---|---|---|
| 2002/0145678 A1 | 10/2002 | Suzuki et al. | |
| 2005/0084011 A1* | 4/2005 | Song | H04N 19/61 375/240.12 |
| 2005/0141002 A1* | 6/2005 | Takano | G06T 5/008 358/1.9 |
| 2005/0280869 A1 | 12/2005 | Kameyama | |
| 2006/0007339 A1 | 1/2006 | Oizumi | |
| 2006/0056702 A1* | 3/2006 | Tsunashima | G06T 7/254 382/219 |
| 2007/0196098 A1* | 8/2007 | Sugimoto | G03B 7/08 396/234 |
| 2011/0285871 A1* | 11/2011 | Sakai | G06T 5/008 348/229.1 |
| 2013/0308012 A1* | 11/2013 | Fukutomi | H04N 1/407 348/229.1 |
| 2014/0226903 A1* | 8/2014 | Kimura | G06T 5/008 382/173 |
| 2015/0146921 A1* | 5/2015 | Ono | H04N 7/18 382/103 |
| 2015/0326753 A1* | 11/2015 | Hu | H04N 1/407 382/167 |
| 2016/0117848 A1* | 4/2016 | Hattori | G06K 9/00818 382/103 |
| 2016/0269597 A1* | 9/2016 | Kanatani | H04N 5/2351 |
| 2017/0076480 A1* | 3/2017 | Matsuoka | G06T 5/008 |
| 2017/0132765 A1* | 5/2017 | Sato | G06T 5/008 |

FOREIGN PATENT DOCUMENTS

| | | |
|---|---|---|
| JP | 2006-024090 A | 1/2006 |
| JP | 2006-301803 A | 11/2006 |
| JP | 2010-066153 A | 3/2010 |
| JP | 2011-258144 A | 12/2011 |
| JP | 2012-074963 A | 4/2012 |

OTHER PUBLICATIONS

"Edge-Based Color Constancy", by J. van de Weijer, T. Gevers, and A. Gijsenij (IEEE Transactions on Image Processing), Sep. 2007, vol. 16, Issue 9, pp. 2207-2214.

"Person Re-identification Algorithms: A Survey", by Y. Ijiri, Y. Kawanishi, M. Minoh, and H. Murase, The Institute of Electronics, Information and Communication Engineers, Technical Report of IEICE, 2011.

International Search Report for PCT Application No. PCT/JP2015/000031, dated Mar. 3, 2015.

English translation of Written opinion for PCT Application No. PCT/JP2015/000031.

* cited by examiner

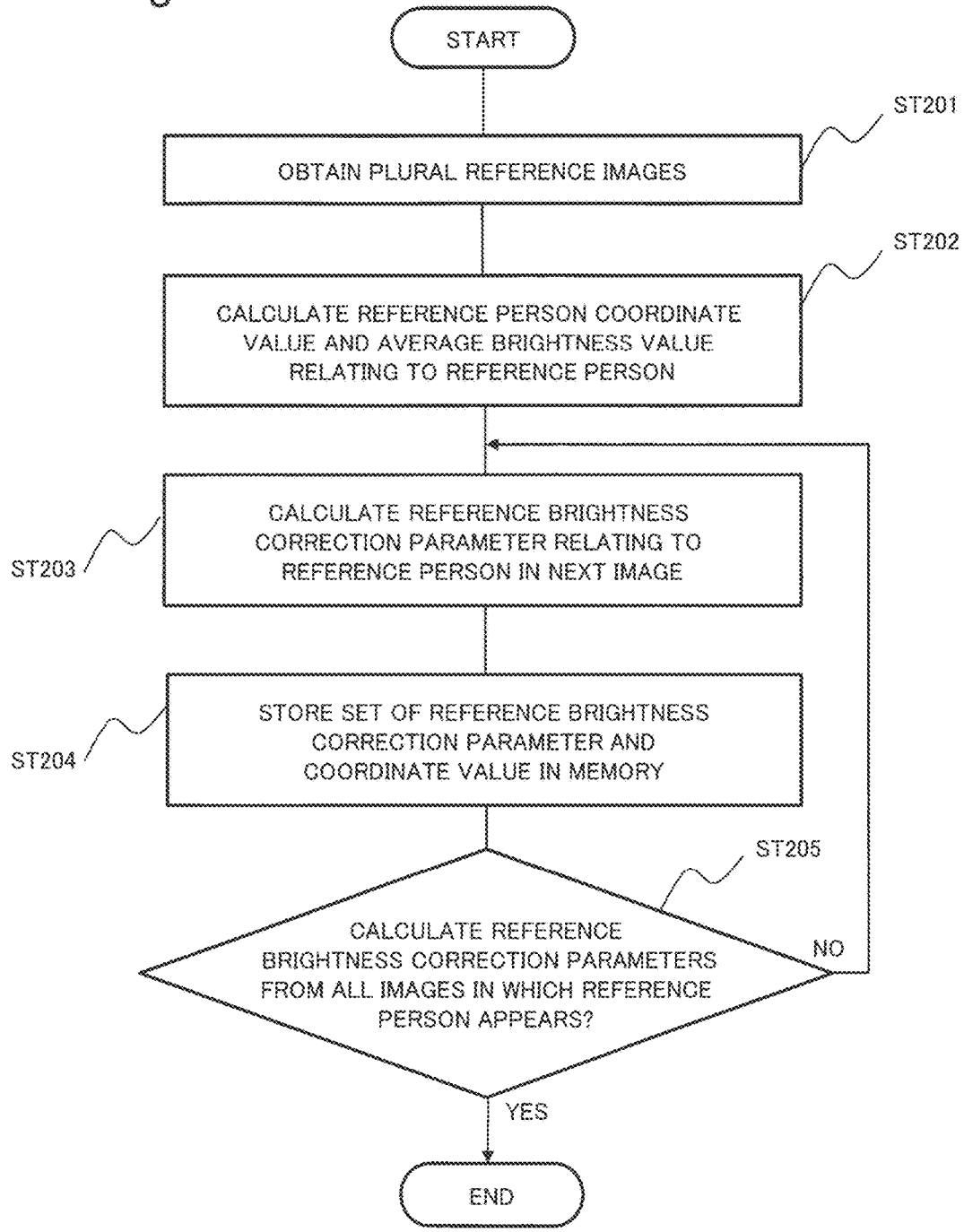

IMAGE CORRECTION DEVICE, IMAGE CORRECTION METHOD AND STORAGE MEDIUM

This application is a National Stage Entry of PCT/JP2015/000031 filed on Jan. 7, 2015, which claims priority from Japanese Patent Application 2014-067595 filed on Mar. 28, 2014, the contents of all of which are incorporated herein by reference, in their entirety.

TECHNICAL FIELD

The present invention relates to technology which corrects images obtained by image capturing means.

BACKGROUND ART

Methods exist to identify target objects based on certain images obtained by image capturing means such as a camera, including methods in which identification is performed by using feature quantities related to shapes and the like, and methods in which identification is performed by using color information. Methods in which identification is performed by using color information are robust with respect to direction of target objects and image-capturing angle, and are instinctively easy to understand, and thus useful.

On the other hand, a problem with methods in which identification is performed by using color information is that color information observed (perceived) in each image changes depending upon individual characteristics of each camera, lighting environment, and the like.

For example, with surveillance which employs a wide-area surveillance system, in some cases multiple cameras are installed in order to survey a wide area. In such cases, lighting environments differ greatly depending on camera installation location, and there is thus a possibility that, even if target objects having the same color are being captured, the objects might be perceived to have different colors. In addition, if cameras having different color characteristics are to be used, it is advisable to do color calibration on the cameras beforehand in order not to make differences in color perception between cameras. However, performing color calibration on all cameras beforehand is difficult, and there is thus a possibility that, even if the same object is captured under the same environments of lighting conditions, the object may be observed as having differing color information.

In addition, even if images are captured by a single camera, in outdoor environments in particular the lighting environment differs greatly depending on the time of the day, and thus the observed color information differs as well.

In order to solve these problems, such color correction technology is necessary that corrects color information obtained from images to stable color information which does not differ depending upon color characteristics of each camera and lighting environments.

The gray world hypothesis is disclosed in NPL 1. In addition, the gray edge hypothesis is disclosed in NPL 2. By utilization of these technologies, lighting colors for a scene (space that is an image capturing target) as a whole can be estimated. In addition, based on the estimated lighting colors, color balance for the scene as a whole can be corrected.

In addition, technology which reconciles the appearance of target objects that moves between multiple cameras is disclosed in NPL 3. With this technology, color correction is performed by defining and calculating the respective brightness transfer functions (BTFs). A BTF is a function which associates a brightness distribution of an image observed by one camera with a brightness distribution of an image observed by another camera. A BTF between two cameras is learned by utilization of color changes of a target object moving between the cameras. A variety of representations exist for BTFs, and gamma correction formulas and histogram distances are types of BTFs.

In this way, by learning BTF between cameras, color correction can be performed such that color information for the same target object can be stably obtained by and among multiple cameras.

In addition, in PTL1, such a visual examination method is disclosed that, even when a state of surfaces of objects to be examined have individual differences, can remove these individual differences and examine the surfaces of the objects with a high degree of accuracy.

In addition, in PTL 2, an image recognition device is disclosed which can perform image recognition with a high degree of accuracy.

Moreover, in PTL 3, such an image processing device is disclosed that can adaptively enhance the quality of moving images automatically with no flickering, regardless of the video source and regardless of the scene.

CITATION LIST

Patent Literature

PTL 1: Japanese Patent Application Laid-Open No. 2010-066153
PTL 2: Japanese Patent Application Laid-Open No. 2006-301803
PTL 3: Japanese Patent Application Laid-Open No. 2002-262303

Non-Patent Literature

NPL 1: "A spatial processor model for object colour perception", by G. Buchsbaum, Journal of the Franklin Institute (J. Franklin Inst.), 1980, Volume 310, Issue 1, pp. 1-26.
NPL 2: "Edge-Based Color Constancy", by J. van de Weijer, T. Gevers, and A. Gijsenij (IEEE transactions on Image Processing), 2007, Volume 16, Issue 9, pp. 2207-2214.
NPL 3: "Person Re-identification between a plurality of cameras with non-overlapping field of views: A Survey", by Y. Ijiri, Y. Kawanishi, M. Minoh, and H. Murase, Technical Committee on Pattern Recognition and Media Understanding, 2011

SUMMARY OF INVENTION

Technical Problem

By the shadows and the like that occur in a space which is an image capturing target (an image capturing space), there is a possibility that, even for a target object captured by a single camera, the object may be perceived as having different brightness depending on location. In other words, when shadows are made locally in an image capturing space due to pillars on buildings and the like, target objects may be captured darkened only in those locations. Thus, there is a problem that the same target object may be captured darkened or brightened depending on location, and recognition accuracy thus deteriorates.

With color correction that utilizes the gray world hypothesis and gray edge hypothesis mentioned above, color balance for an image as a whole can be adjusted, but differences of lighting strength depending on location cannot be corrected.

The methods that calculate BTFs also only calculating differences in brightness distribution between cameras, and thus differences of lighting strength cannot be corrected in situations in which lighting in the image capturing space changes.

The visual examination method disclosed in PTL 1 is a technology which corrects individual differences in objects with the same size and shape in each captured image, and thus differences of lighting strength depending on location in the image capturing space cannot be corrected.

Likewise, in PTL 2 and PTL 3 as well, differences of lighting strength depending on location in the image capturing space cannot be corrected.

The present invention is made in light of the matters described above, and a main object of the present invention is to provide an image correction device and the like which can stably identify the target object in the captured image even when the lighting strength differs depending on location in the image capturing space.

Solution to Problem

An image correction device according to the one aspect of the invention includes: reference brightness correction parameter calculation means which calculates, in a reference image in which a reference object moving in a space that is an image capturing target is captured, a reference brightness correction parameter based on brightness information relating to an area of the reference object and coordinate information specifying a position of the area, and correction means which corrects a captured image in which the space is captured and a correction-target object is captured, based on the reference brightness correction parameter.

An image correction method according to the one aspect of the invention includes: calculating, in a reference image in which a reference object moving in a space that is an image capturing target is captured, a reference brightness correction parameter based on brightness information relating to an area of the reference object and coordinate information specifying a position of the area, and correcting a captured image in which the space is captured and a correction-target object is included, based on the reference brightness correction parameter.

Further, the object is also achieved by a computer program which realizes the image correction device or the image correction method including individual configurations mentioned above by a computer, and a computer-readable storage medium in which the computer program is stored.

Advantageous Effects of Invention

According to the present invention, the effect is obtained that the target object in the captured image is stably identified even when the lighting strength is not uniform depending on location in the image capturing space.

BRIEF DESCRIPTION OF DRAWINGS

FIG. 2 is a flowchart illustrating an operation of a reference brightness correction parameter calculation unit in the image correction device according to the first exemplary embodiment of the present invention;

DESCRIPTION OF EMBODIMENTS

Exemplary embodiments of the present invention will be illustrated with reference to the drawings.

First Exemplary Embodiment

Figure 1:
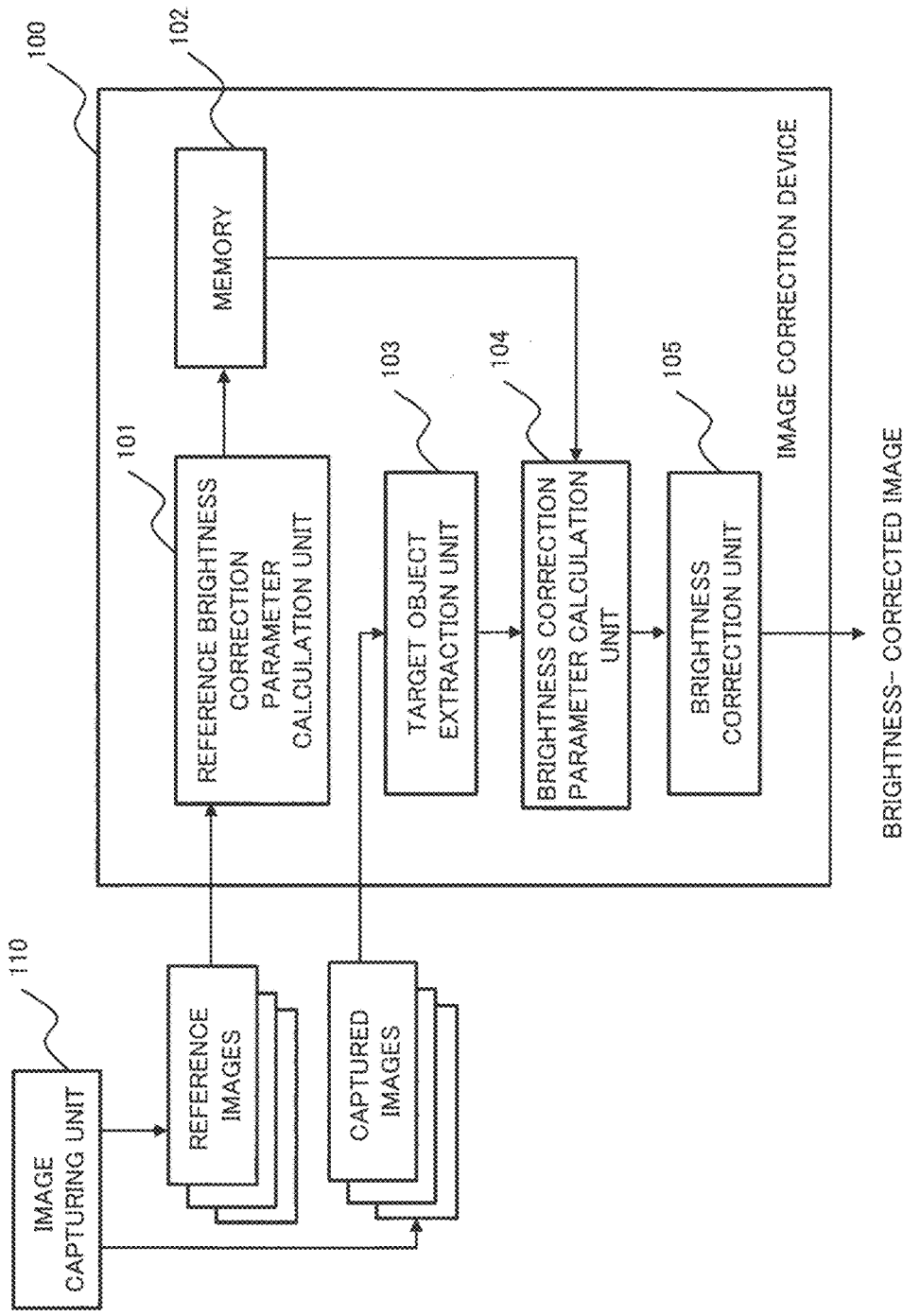
FIG. 1 is a block diagram illustrating a configuration example of an image correction device according to a first exemplary embodiment of the present invention.

FIG. 1 is a block diagram illustrating a configuration example of an image correction device 100 according to a first exemplary embodiment of the present invention. As illustrated in FIG. 1, the image correction device 100 includes a reference brightness correction parameter calculation unit 101, a memory 102, a target object extraction unit 103, a brightness correction parameter calculation unit 104, and a brightness correction unit 105.

In the present exemplary embodiment, such an image correction device is illustrated that is applied to the identification of people, but is not limited to the example illustrated in the present exemplary embodiment. In other words, the image correction device may be applied to, for example, the identification of objects other than people.

An overview of components included in the image correction device 100 according to the present exemplary embodiment will be illustrated.

The reference brightness correction parameter calculation unit 101 calculates parameters (hereinafter referred to as "reference brightness correction parameters"), which are utilized to correct images (captured images) that have been captured from the image capturing space (scene) which is the image capturing target, based on an input reference image. The reference image is an image used as a reference when calculating parameters and the like for correcting captured images. Reference images are images in which at least the same scene has been captured as the captured images, and in which at least a reference object which is utilized for calculating reference brightness correction parameters is contained.

The memory 102 is a storage area for reference brightness correction parameters and the like calculated by the reference brightness correction parameter calculation unit 101.

The target object extraction unit 103 extracts people to be identified from the captured images; i.e., the images obtained by an image capturing unit 110 such as a surveillance camera. The brightness correction parameter calculation unit 104 calculates brightness correction parameters for the people extracted by the target object extraction unit 103, while referring to the memory 102.

The brightness correction unit 105 corrects the captured images by using the parameters calculated by the brightness correction parameter calculation unit 104.

FIG. 2 is a flowchart illustrating operation of the reference brightness correction parameter calculation unit 101 in the image correction device 100 according to the present exemplary embodiment. The operation of the reference brightness correction parameter calculation unit 101 will be illustrated with reference to FIG. 2.

The reference brightness correction parameter calculation unit 101 first obtains plural reference images resulting from capturing a certain scene (step ST201). Then, based on the obtained plural reference images, the reference brightness correction parameter calculation unit 101 calculates the reference brightness correction parameter which is to be associated with a coordinate value (coordinate information). The reference brightness correction parameter is a parameter for correcting the brightness of captured images obtained by the image capturing unit 110 such as the surveillance camera and the like.

Calculation of an average brightness value, which the reference brightness correction parameter calculation unit 101 utilizes to calculate the reference brightness correction parameters, will be illustrated. The reference brightness correction parameter calculation unit 101 extracts, in response to operation by a user, a person (hereinafter referred to as a "reference person") known in advance to be the same person as is contained in the obtained plural reference images, and also calculates average values of brightness values (brightness information) for pixels (coordinates) in areas in which these reference persons are displayed. In the following illustration, coordinates are assumed to be a two-dimensional X-Y coordinate system.

Figure 3A:
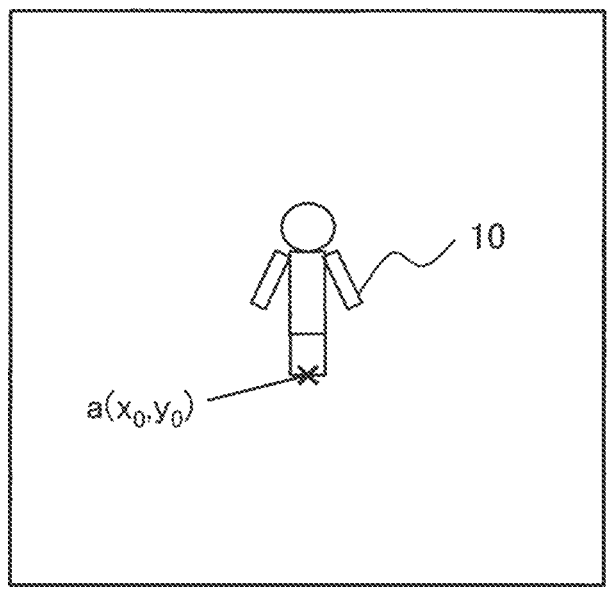
FIG. 3A is a diagram illustrating an example of a reference image obtained by an image capturing unit in the image correction device according to the first exemplary embodiment of the present invention.
Figure 3B:
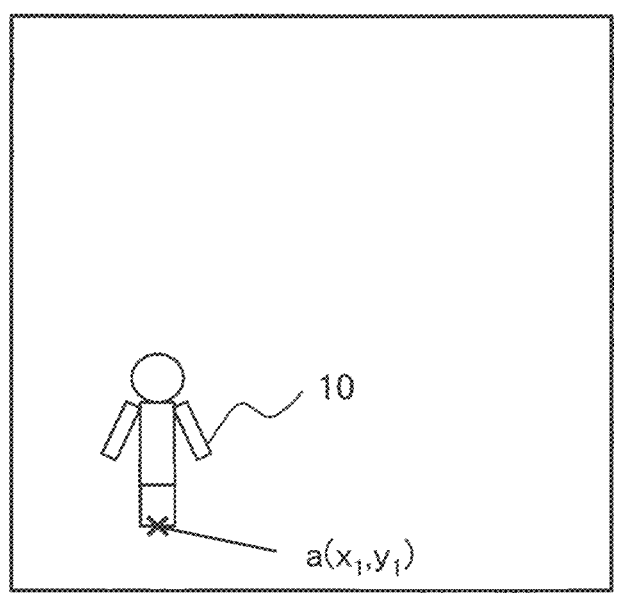
FIG. 3B is a diagram illustrating an example of a reference image obtained by the image capturing unit in the image correction device according to the first exemplary embodiment of the present invention.
Figure 3C:
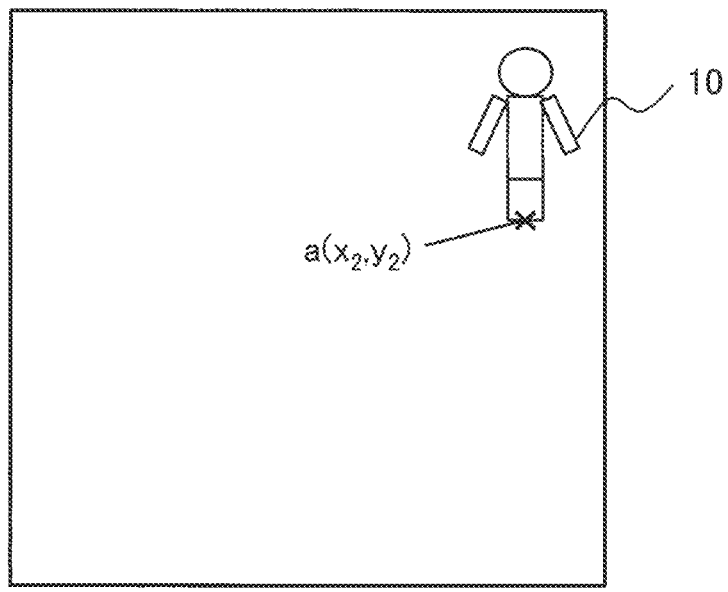
FIG. 3C is a diagram illustrating an example of a reference image obtained by the image capturing unit in the image correction device according to the first exemplary embodiment of the present invention.

FIGS. 3A, 3B, and 3C are diagrams illustrating an example of reference images obtained by the image capturing unit 110. Upon having extracted a reference person 10 for example, as illustrated in FIG. 3A, the reference brightness correction parameter calculation unit 101 calculates brightness values Y using formula (1) below for the respective pixels in the area in which the reference person 10 is displayed, by using the RGB (R: Red, G: Green, B: Blue) values of the respective pixels.

$$Y = 0.2126 \times R + 0.7152 \times G + 0.0722 \times B \quad (1)$$

In the present exemplary embodiment, "×" represents multiplication.

The reference brightness correction parameter calculation unit 101 calculates an average value of the brightness values calculated as described above, i.e., an average brightness value $Y_{av}$ using formula (2) below.

$$Y_{av} = (\Sigma Y)/P \quad (2)$$

P represents a total number of pixels in the area in which the reference person 10 is displayed. $\Sigma Y$ represents a total sum of the brightness values in the respective pixels. In the present exemplary embodiment, "/" represents division.

The reference brightness correction parameter calculation unit 101 calculates the reference brightness correction parameter using formulas (1) and (2) above as follows.

First, the reference brightness correction parameter calculation unit 101 calculates, based on a specific image out of the plural reference images, a reference person coordinate value and an average brightness value for the person (step ST202). The specific image is an image in which color information related to the reference person 10 is clear, and is selected, for example, by a user out of the plural reference images. In addition, if FIG. 3A, for example, is the image in which the color information related to the reference person 10 is clear, the reference brightness correction parameter calculation unit 101 extracts coordinate value $(x_0, y_0)$ which specifies a specific point specifying the position of the reference person 10, which values are assumed to be the reference person coordinate values. The reference brightness correction parameter calculation unit 101 calculates the average brightness value related to the reference person 10 using formulas (1) and (2) above, which the calculated result is assumed to be the average brightness value $Y_0$.

Here, the coordinate value extracted as described above is a coordinate value which represents a specific point in the area in which the reference person 10 is displayed. For example, the reference brightness correction parameter calculation unit 101 may extract coordinate values at a lowermost end "a" of the area in which the reference person 10 is displayed, as illustrated in FIG. 3A. The reference brightness correction parameter calculation unit 101 may extract position information (position of pixel) in the reference image as the coordinate value, or may estimate the positional relationship between the image capturing space and the reference image and extract the coordinate value at the intended positional relationship. The coordinate value at the lowermost end "a" of the area in which the reference person 10 is displayed is assumed to be the coordinate value extracted as described above.

Subsequently, based on the average brightness value $Y_0$ calculated as described above and on other reference images in which the reference person 10 appears, the reference brightness correction parameter calculation unit 101 calculates the reference brightness correction parameter (step ST203). For example, assuming that the reference image illustrated in FIG. 3B is the first reference image in which the reference person 10 appears, the reference brightness correction parameter calculation unit 101 calculates an average brightness value $Y_1$ related to the reference person 10 using formulas (1) and (2) above. Then the reference brightness correction parameter calculation unit 101 calculates the reference brightness correction parameter $p_1$ which is to be associated with coordinate value $(x_1, y_1)$ representing the lowermost end "a" of the reference person 10 according to, for example, formula (3) below.

$$p_1 = Y_0/Y_1 \quad (3)$$

In other words, a reference brightness correction parameter $p_n$ which is to be associated with coordinate value ($x_n$, $y_n$) can be calculated according to formula (4) below.

$$p_n = Y_0/Y_n \quad (4)$$

After calculating the reference brightness correction parameter $p_1$ according to formula (3) above, the reference brightness correction parameter calculation unit 101 stores a set $\{x_1, y_1, p_1\}$ including the calculated $p_1$ and the coordinate value ($x_1$, $y_1$) in memory (step ST204).

Assuming that FIG. 3C is the second image, for example, in which the reference person 10 appears, for the image as well, the reference brightness correction parameter calculation unit 101 calculates a reference brightness correction parameter p2 associated with coordinate value ($x_2$, $y_2$) representing the lowermost end "a" of the reference person 10 using formula (4) above, and then stores a set $\{x_2, y_2, p_2\}$ including the reference brightness correction parameter p2 and the coordinate value ($x_2$, $y_2$) in memory.

The reference brightness correction parameter calculation unit 101 calculates the reference brightness correction parameter described above for the plural images in which the reference person 10 appears out of the input reference images (step ST205).

In the present exemplary embodiment, a method has been described in which the reference brightness correction parameter calculation unit 101 calculates the reference brightness correction parameters by using tracking results for one person. However, the present invention is not limited to this configuration, but it is also acceptable for the reference brightness correction parameters to be calculated by using tracking results for plural people.

In addition, the reference brightness correction parameter calculation unit 101 may store the coordinate values which represents the specific point on the reference person and the reference brightness correction parameter being not associated with each other. In other words, the reference brightness correction parameter calculation unit 101 may divide the area of a scene in which a reference person appears into plural areas and calculate and store the reference brightness correction parameter for each of the areas. Following the procedure described above, the reference brightness correction parameter calculation unit 101 calculates the reference brightness correction parameters.

Figure 4:
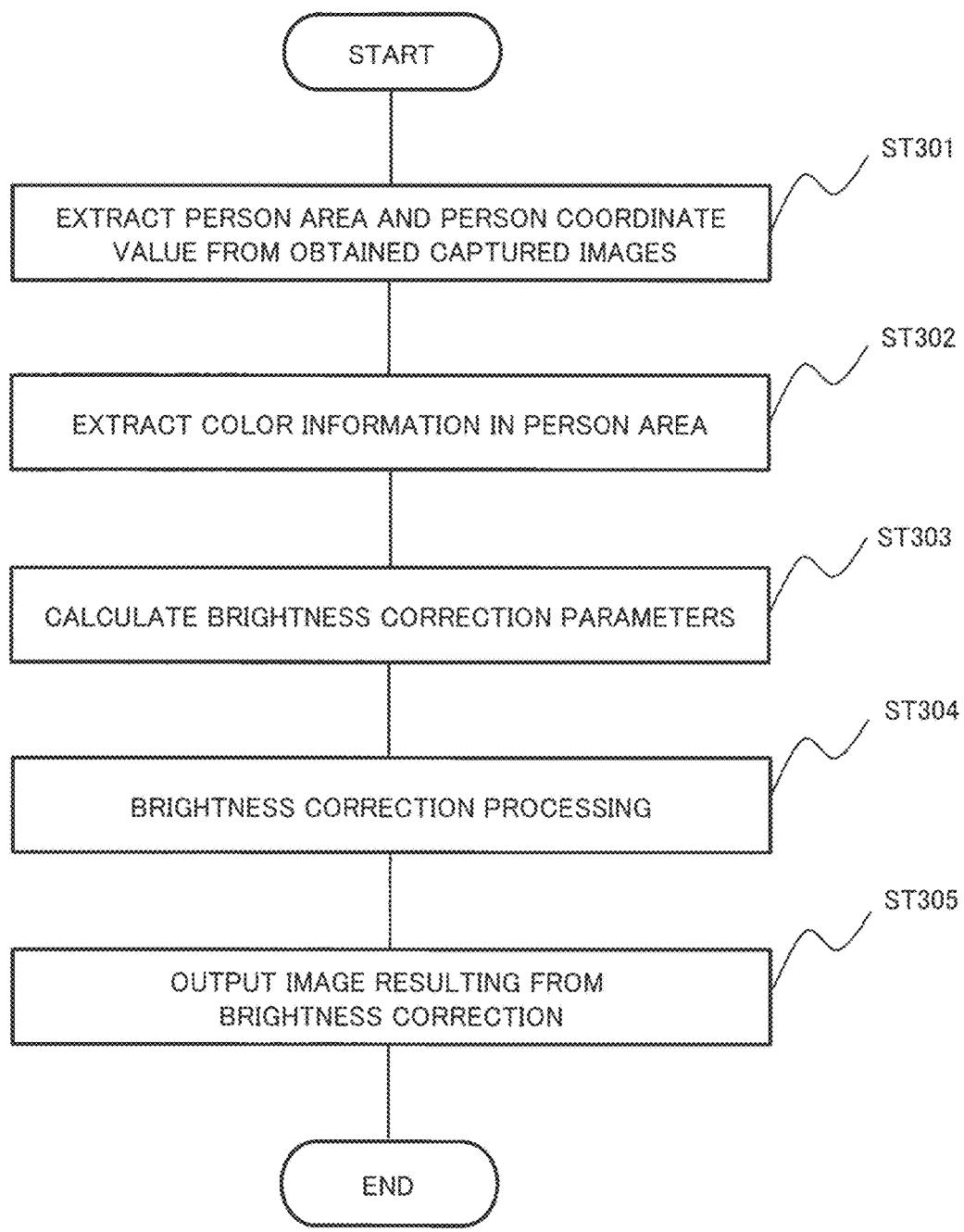
FIG. 4 is a flowchart illustrating operation in which a captured image obtained by the image capturing unit in the image correction device according to the first exemplary embodiment of the present invention is corrected by using a reference brightness correction parameter.

Next, a procedure for correct captured images using the reference brightness correction parameters calculated as described above will be illustrated. FIG. 4 is a flowchart illustrating a procedure for correcting captured images obtained by the image capturing unit 110 using the reference brightness correction parameters stored in the memory 102. The procedure for correcting captured images will be illustrated with reference to FIG. 4.

For each input captured image, the target object extraction unit 103 extracts the area occupied by the person (hereinafter referred to as the "person area") for the input captured image, as well as a coordinate value at which the person is positioned (hereinafter referred to as a "person coordinate value") for each image (step ST301). The person coordinate value is assumed to be the coordinate values representing a specific point in the person area.

The target object extraction unit 103 extracts the person area using background differencing technique and the like. However, the target object extraction unit 103 extracts the area so as not to contain shadows of the person.

The target object extraction unit 103 extracts color information for respective pixels contained in the person area (step ST302). The target object extraction unit 103 obtains as color information, values for the respective channels in the color space, such as the RGB color space, the L*a*b* color space, or the HSV (H: Hue, S: Saturation, V: Value) color space. In the present exemplary embodiment, values related to the RGB color space are extracted.

Subsequently, the brightness correction parameter calculation unit 104 calculates the brightness correction parameters (step ST303) as follows.

Figure 5:
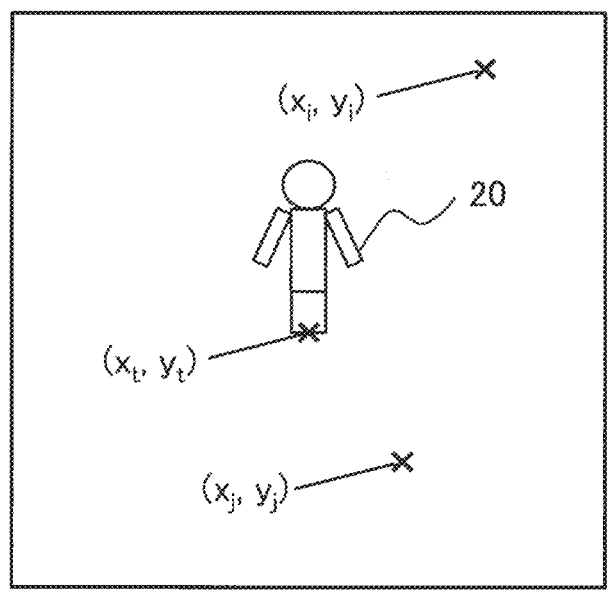
FIG. 5 is a diagram illustrating an example of a captured image obtained by the image correction device according to the first exemplary embodiment of the present invention.

FIG. 5 is a diagram illustrating an example of a captured image obtained by the image correction device 100. Assume that the target object extraction unit 103 has extracted a person area 20 illustrated in FIG. 5 as the person to be corrected (the correction-target person). The brightness correction parameter calculation unit 104 calculates the brightness correction parameters so as to perform brightness correction on the correction-target person 20 as follows.

In other words, the brightness correction parameter calculation unit 104 calculates a brightness correction parameter $p_t$ which is to be associated with the person coordinate value ($x_t$, $y_t$) at which the correction-target person 20 extracted by the target object extraction unit 103 is positioned, based on the one or more reference brightness correction parameters, stored in the memory 102. The one or more reference brightness correction parameters is the reference brightness correction parameters each associated with the one or more coordinate value specifying near the position to the person coordinate value ($x_t$, $y_t$). The "one or more coordinate value specifying near the position to the person coordinate value ($x_t$, $y_t$)" may be two coordinate values specifying the position which are the shortest distance from the person coordinate value ($x_t$, $y_t$) out of the plural coordinate values stored in the memory 102.

For example, assume that coordinate value ($x_i$, $y_i$) and coordinate value ($x_j$, $y_j$) both of which are illustrated in FIG. 5, and reference brightness correction parameters $p_i$ and $p_j$ associated therewith are stored in the memory 102.

The brightness correction parameter calculation unit 104 extracts the coordinate value ($x_i$, $y_i$), the coordinate value ($x_j$, $y_j$) as two coordinate values specifying near the position to the person coordinate value ($x_t$, $y_t$) and extracts the reference brightness correction parameters $p_i$ and $p_j$ each associated therewith from the memory 102.

Here, assume $l_i$ to be a distance between the person coordinate value ($x_t$, $y_t$) and the coordinate value ($x_i$, $y_i$), and assume $l_j$ to be a distance between the person coordinate value ($x_t$, $y_t$) and the coordinate value ($x_j$, $y_j$). The brightness correction parameter calculation unit 104 calculates the brightness correction parameter $P_t$ by performing linear interpolation using, for example, formula (5) below.

$$p_t = p_i \times l_j/(l_i+l_j) + p_j \times l_i/(l_i+l_j) \quad (5)$$

Note that, alternatively to such interpolation methods, other interpolation methods such as spline interpolation are also acceptable.

Subsequently, using the brightness correction parameter calculated by the brightness correction parameter calculation unit 104, the brightness correction unit 105 performs brightness correction on the R, G, and B values of each pixel contained in the person area extracted by the target object extraction unit 103 (step ST304).

For example, using the brightness correction parameter $P_r$, the brightness correction unit 105 performs correction on each pixel contained in the person area 20 in accordance with formula (6) below.

$$R'=p_r \times R$$

$$G'=p_r \times G$$

$$B'=P_r \times B \qquad (6)$$

Note that (R, G, B) represents the R, G, and B values of each pixel contained in the person area 20 before correction, and (R', G', B') represents the R, G, and B values after correction. The brightness correction unit 105 may alternatively perform correction by utilizing an exponential function and the like, being not to be limited to formula (6) above.

The brightness correction unit 105 outputs a brightness-corrected image resulting from having performed brightness correction as described above (step ST305). When the target object extraction unit 103 extracted plural correction-target person areas, it is acceptable for the brightness correction parameter calculation unit 104 and the brightness correction unit 105 to perform the processing from step ST302 to step ST304 on each correction-target person area.

As stated above, according to the present exemplary embodiment, the reference brightness correction parameter calculation unit 101 calculates the reference brightness correction parameter based on a ratio of the average brightness value of each position of the moving same person and the reference average brightness value calculated from the reference image in which the person appears clearly, with being in association with the coordinate values specifying the position of the person. Based on the reference brightness correction parameter, the brightness correction parameter calculation unit 104 calculates an optimal brightness correction parameter for each coordinate value of the person who appears in the captured image. Using the brightness correction parameters, the brightness correction unit 105 performs correction such that the target object in the captured image takes on an appropriate brightness. Thus, according to the present exemplary embodiment, even in images which capture scenes with which lighting strength differs depending on location, such an effect is achieved that a target object can be stably identified.

Second Exemplary Embodiment

Figure 6:
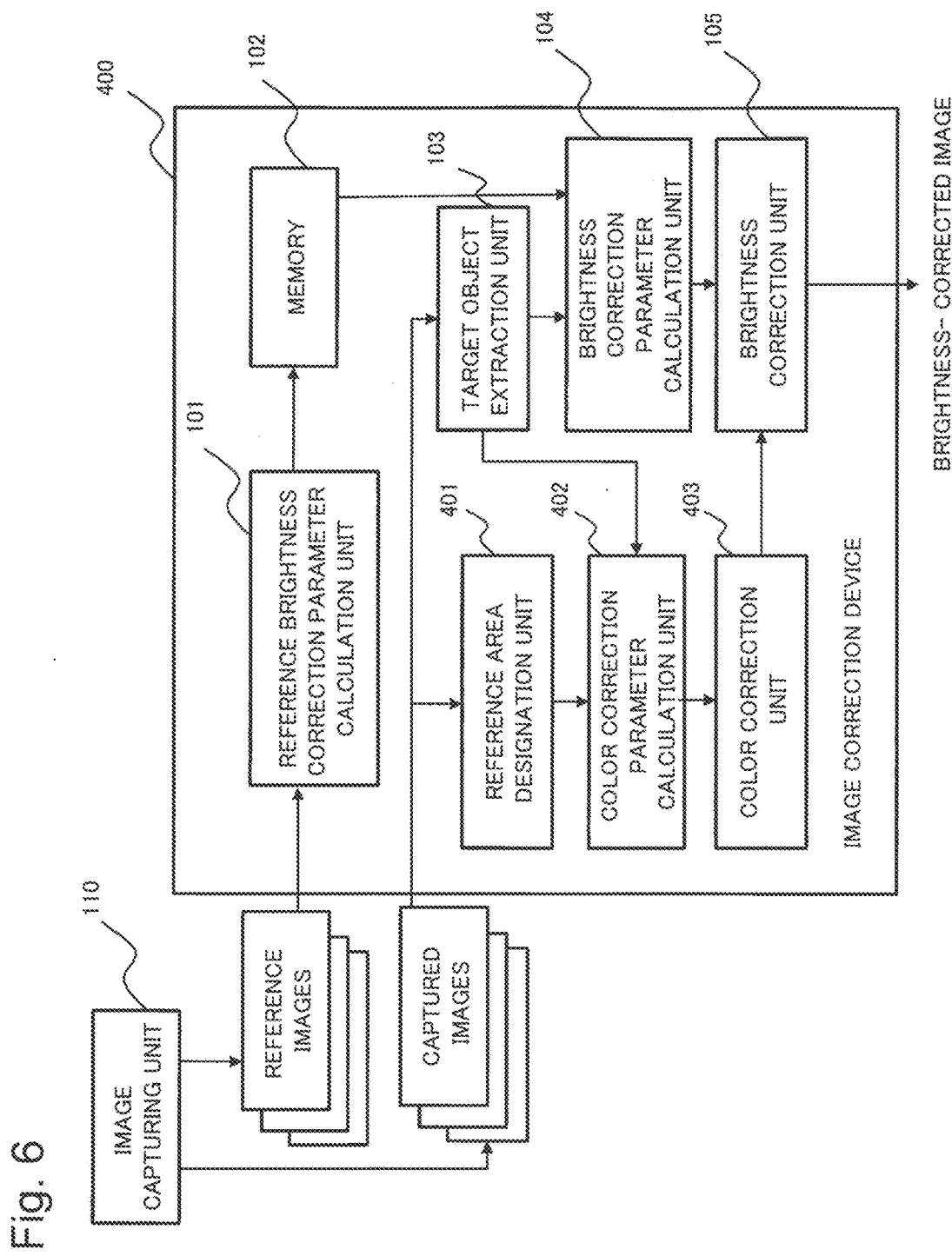
FIG. 6 is a block diagram illustrating a configuration example of an image correction device according to a second exemplary embodiment of the present invention.

FIG. 6 is a block diagram illustrating a configuration example of an image correction device 400 according to a second exemplary embodiment of the present invention. As illustrated in FIG. 6, in addition to the configuration of the image correction device 100 illustrated in the first exemplary embodiment, the image correction device 400 includes a reference area designation unit 401, a color correction parameter calculation unit 402, and a color correction unit 403.

The reference brightness correction parameter calculation unit 101, the memory 102, the target object extraction unit 103, the brightness correction parameter calculation unit 104, and the brightness correction unit 105 which constitute the image correction device 400 operate in the same manner as the units in the image correction device 100 illustrated in the first exemplary embodiment above respectively, and thus descriptions thereof are omitted. The reference area designation unit 401, the color correction parameter calculation unit 402, and the color correction unit 403 of the present exemplary embodiment will be illustrated.

The reference area designation unit 401, the color correction parameter calculation unit 402, and the color correction unit 403 have functions of performing color correction on captured images obtained by the image capturing unit 110.

Figure 7:
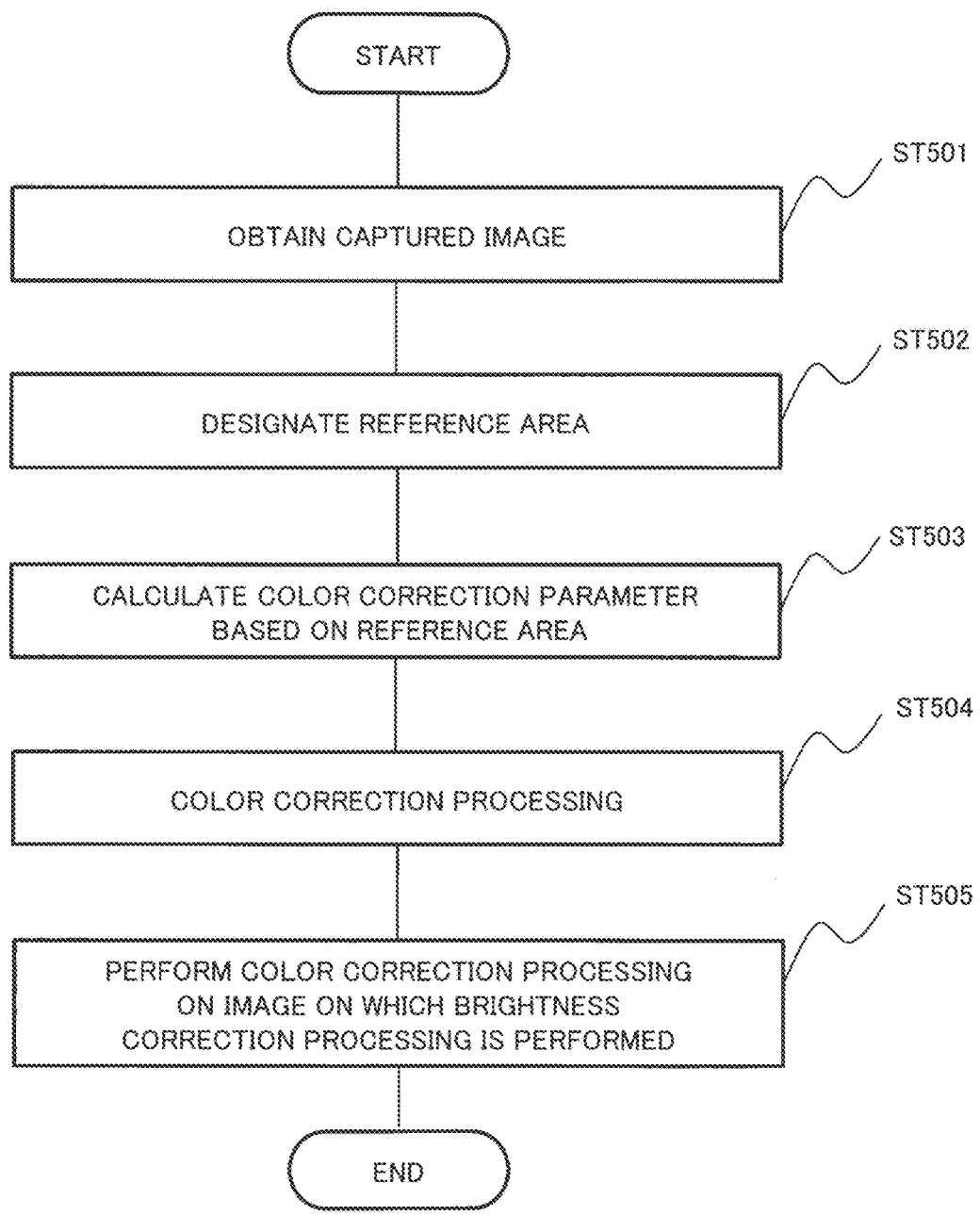
FIG. 7 is a flowchart illustrating correction processing by the image correction device according to the second exemplary embodiment of the present invention.

FIG. 7 is a flowchart illustrating correction processing performed by the image correction device 400. The correction processing performed by the image correction device 400 will be illustrated with reference to FIG. 7.

In the same manner as with the target object extraction unit 103 illustrated in the first exemplary embodiment above, the reference area designation unit 401 obtains the captured image (step ST501). From one of the obtained captured images, the reference area designation unit 401 designates an achromatic area (hereafter referred to as a "reference area") (step ST502). For example, the reference area designation unit 401 may designate an area which has been selected by a user by a drag operation as the achromatic area, and obtain the coordinate values which comprise the area. The reference area may be area with white color, gray color or nearly achromatic color even though it is not completely achromatic color. The reference area may not be area with uniformly colored.

The color correction parameter calculation unit 402 estimates the lighting color using the color information for the reference area designated by the reference area designation unit 401, and calculates the color correction parameter (step ST503).

Note that the color correction parameter calculation unit 402 does not need to calculate the color correction parameter for all images, and may calculate the color correction parameter for images at intervals.

In addition, the color correction parameter calculation unit 402 refers to the person area extracted by the target object extraction unit 103 illustrated in the first exemplary embodiment, and if the person area extracted by the target object extraction unit 103 is contained in the reference area designated by the reference area designation unit 401, the color correction parameter calculation unit 402 calculates the color correction parameter by using the color information for an area removing such an area from the reference area that overlaps with the person area. If the entire reference area overlaps with the person area, the color correction parameter calculation unit 402 will not use the image to estimate the lighting color, and will calculate the color correction parameter, based on previous and subsequent images.

Lighting color estimation may be performed by using methods which have already been proposed, such as the gray world hypothesis or the gray edge hypothesis.

As an example, a color correction parameter calculation procedure which uses the gray world hypothesis will be illustrated as follows. Values for the respective channels of the RGB color space in the reference area will be utilized as color information. Assuming that (sumR, sumG, sumB) are the values resulting from summing up all of the color information in the reference area, the color correction parameter calculation unit 402 calculates the lighting color vector (wR, wG, wB) using formula (7) below.

$$wR = sumR/sum$$

$$wG = sumG/sum$$

$$wB = sumB/sum \qquad (7)$$

Here, "sum" represents the following.

$$\text{sum} = \sqrt{\text{sum}R^2 + \text{sum}G^2 + \text{sum}B^2}$$

The color correction unit 403 uses the lighting color vector (wR, wG, wB) calculated as described above as the color correction parameter.

In other words, the color correction unit 403 performs color correction by using the color correction parameter calculated by the color correction parameter calculation unit 402 (step ST504). For example, when the lighting color vector calculated, based on the gray world hypothesis described above is used as the color correction parameter, the color correction unit 403 corrects the RGB values related to certain coordinate values using formula (8) below.

$$R' = R/(\sqrt{3} \times wR)$$

$$G' = G/(\sqrt{3} \times wG)$$

$$B' = B/(\sqrt{3} \times wB) \qquad (8)$$

Here, (R, G, B) represents the R, G, and B values before correction, and (R', G', B') represents the R, G, and B values after correction.

The color correction unit 403 provides the (R', G', B') values resulting from correction as described above with the brightness correction unit 105. The brightness correction unit 105 performs color correction processing on the image on which brightness correction processing had been performed as described in the first exemplary embodiment using the obtained (R', G', B') values (step S505).

Another example in which an achromatic area is designated by the reference area designation unit 401 will be described. The reference area designation unit 401 may designate plural achromatic areas. For example, when there are lights in a scene which light different colors, the color correction unit 403 can correct the differences of the different lighting colors by designating the plural areas which are lighted by the respective color lighting, and by estimating each lighting color.

When the plural reference areas are designated by the reference area designation unit 401, the color correction parameter calculation unit 402 derives plural color correction parameters for every plural reference area. The color correction unit 403 may perform, for example, correction by using a value of the plural color correction parameters which is weighed according to the distance from the reference area.

Figure 8:
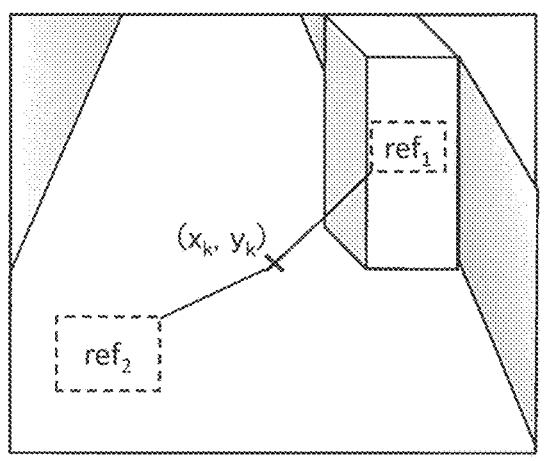
FIG. 8 is a diagram illustrating an example of an image of which two reference areas have been designated by a reference area designation unit in the image correction device according to the second exemplary embodiment of the present invention.

FIG. 8 is a diagram illustrating an example of an image for which two reference areas have been designated by the reference area designation unit 401. With reference to FIG. 8, a procedure will be described to calculate (R', G', B') related to certain coordinate value ($x_k$, $y_k$), when two reference areas have been designated by the reference area designation unit 401.

The color correction parameter calculation unit 402 calculates lighting color vectors (wR$_1$, wG$_1$, wB$_1$) and (wR$_2$, wG$_2$, wB$_2$), based on color information related to the two designated reference areas ref$_1$ and ref$_2$ using formula (7).

Here, $l_1$ is assumed to be distances between ref$_1$ and the coordinate value ($x_k$, $y_k$), and $l_2$ is assumed to be distances between ref$_2$ and the coordinate value ($x_k$, $y_k$). The distance is assumed, for example, to be the distance between the center of the reference area and the coordinate value ($x_k$, $y_k$). Then, the lighting color vector (color correction parameter) (wR, wG, wB) at the coordinate value ($x_k$, $y_k$) is calculated by using, for example, a linear sum of the lighting colors which is weighed according to the distance from the two reference areas, as in formula (9) below.

$$wR = wR_1 \times l_2/(l_1+l_2) + wR_2 \times l_1/(l_1+l_2)$$

$$wG = wG_1 \times l_2/(l_1+l_2) + wG_2 \times l_1/(l_1+l_2)$$

$$wB = wB_1 \times l_2/(l_1+l_2) + wB_2 \times l_1/(l_1+l_2) \qquad (9)$$

The color correction unit 403 is not limited to calculate using the formula above. The color correction unit 403 may correct the entire image by using, for example, the average value of the lighting color vectors related to the respective reference areas.

Here, adjusting color correction strength will be described. The color correction unit 403 may adjust color correction strength by setting a correction strength parameter. The reference area designation unit 401 designates an area which is considered to be achromatic in the scene. However, it is conceivable that there may be few instances that the color in an actual scene in which the designated reference area has been captured is completely achromatic. In such cases, there may be a case that correction is applied too strongly, and the image is corrected to colors that differ from the actual colors of the scene.

For example, when an actual scene is bluish gray, the lighting color of the scene is estimated to be blue. In this case, if color correction is performed as described above based on this lighting color, correction is performed such that the blue color of the lighting is eliminated, and thus correction will be performed so that the color will be more reddish slightly than the actual scene color.

In order to prevent this sort of over-correction, it is acceptable for the color correction unit 403 to set correction strength so as to perform correction such that a certain proportion of the estimated lighting color is eliminated, rather than having the estimated lighting color completely eliminated. The color correction unit 403 may perform correction, for example, according to formula (10) below when it sets a correction strength parameter.

$$R' = R/(k \times wR \times \sqrt{3} + 1 - k)$$

$$G' = G/(k \times wG \times \sqrt{3} + 1 - k)$$

$$B' = B/(k \times wB \times \sqrt{3} + 1 - k) \qquad (10)$$

Here, k ($0 \leq k \leq 1$) represents the correction strength parameter. When k is set to 0, color correction is not performed, and when k is set to 1, lighting color is completely eliminated in the same manner as in formula (8), in which correction strength is not adjusted.

Note that, regarding correction processing on the image, brightness correction processing is performed first, and subsequently color correction processing is performed, as illustrated in step ST505 in the present exemplary embodiment. However, being not limited to this example, brightness correction processing may be performed after color correction processing is performed.

As stated above, according to the present exemplary embodiment, the color correction parameter calculation unit 402 calculates the color correction parameter by estimating the lighting color. The color correction unit 403 performs color correction on the captured image by using the calculated color correction parameter. Thus, according to the present exemplary embodiment, the color differences in the target object due to the influences of the lighting colors of the scene or the individual characteristics of the camera can be suppressed, and the advantageous effect that the improvement of identification accuracy of target objects can be attained.

Third Exemplary Embodiment

Figure 9:
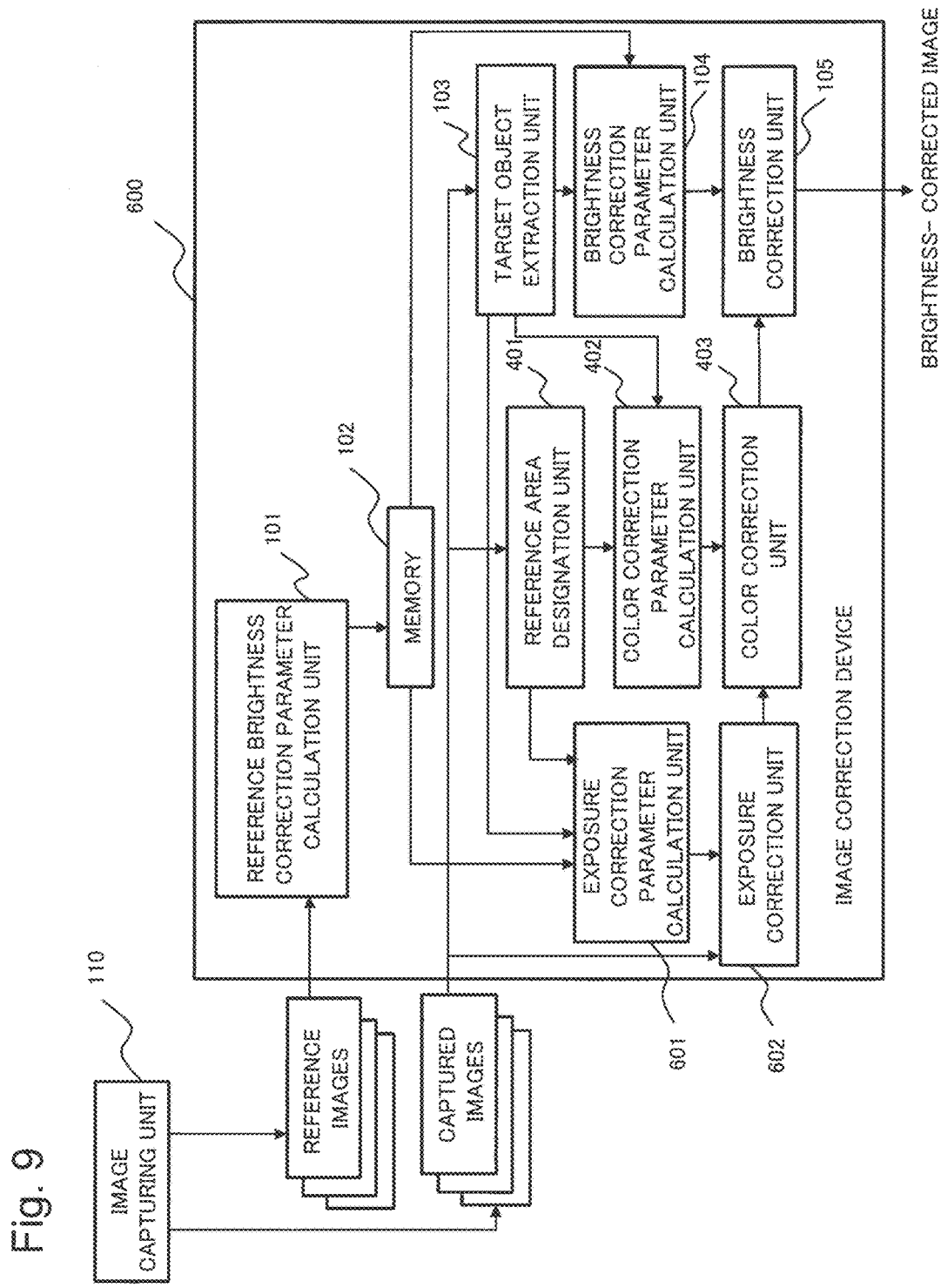
FIG. 9 is a block diagram illustrating a configuration example of an image correction device according to a third exemplary embodiment of the present invention.

FIG. 9 is a block diagram illustrating a configuration example of an image correction device 600 according to a third exemplary embodiment of the present invention. As illustrated in FIG. 9, in addition to the image correction device 400 illustrated in the second exemplary embodiment, the image correction device 600 includes an exposure correction parameter calculation unit 601 and an exposure correction unit 602.

In the image correction device 600, components which are the same as those in the image correction device 400 illustrated in the second exemplary embodiment operate in the same manner as the second exemplary embodiment above, and thus explanations of these are omitted. The exposure correction parameter calculation unit 601 and the exposure correction unit 602 of the present exemplary embodiment will be described.

The exposure correction parameter calculation unit 601 and the exposure correction unit 602 have functions of performing brightness correction on captured images obtained by the image capturing unit 110.

In the images taken of the same scene captured by a single camera, in outdoor environments in particular, the strength of the lighting may in some cases change greatly, depending on the times of day at which the images are captured. In such cases, even if a person to be identified stays in the same location, there is a possibility that, due to change in appearance, the camera may not be able to recognize that the person is the same person. In light of this, in the third exemplary embodiment, a configuration will be illustrated which can obtain color information for target objects more robustly by performing correction such that the brightness of the entire scene becomes stable throughout the day.

In the same manner as for the reference area designation unit 401 illustrated in the second exemplary embodiment above, the exposure correction parameter calculation unit 601 obtains captured images. The exposure correction parameter calculation unit 601 calculates an exposure correction parameter, based on, for example, the brightness information for the reference area designated by the reference area designation unit 401.

Specifically, the exposure correction parameter calculation unit 601 calculates brightness values related to the reference area in an image with appropriate exposure, out of captured images for which a reference area was designated by the reference area designation unit 401. The exposure correction parameter calculation unit 601 records the calculated value in the memory 102 as a reference brightness value $E_0$.

Subsequently, in an image which contains the correction-target person, the exposure correction parameter calculation unit 601 calculates a brightness value related to the reference area designated by the reference area designation unit 401. Assuming that Em to be this calculated value, the exposure correction parameter calculation unit 601 calculates an exposure correction parameter $p_m$ using, for example, formula (11) below.

$$p_m = E_0/E_m \quad (11)$$

Here, the exposure correction parameter calculation unit 601 does not need to calculate the exposure correction parameter for all images, and may calculate the color correction parameter for images at intervals. In addition, when the person area extracted by the target object extraction unit 103 is contained in the reference area designated by the reference area designation unit 401, brightness information for an area eliminating the person area from the reference area will be utilized. When the entire reference area is contained in the person area, the exposure correction parameter calculation unit 601 does not use the image to calculate the exposure parameter, but calculates the exposure correction parameter, based on previous and subsequent images.

Subsequently, the exposure correction unit 602 performs correction on each pixel in the image according to formula (12) below using the exposure correction parameter $p_m$.

$$R'' = p_m \times R$$

$$G'' = p_m \times G$$

$$B'' = p_m \times B \quad (12)$$

Here, (R, G, B) represents the R, G, and B values before correction, and (R", G", B") represents the R, G, and B values after correction. Note that the exposure correction unit 602 is not limited to use formula (12) above, but may perform correction using exponential functions and the like.

The exposure correction unit 602 provides the (R", G", B") values corrected as described above with the color correction unit 403. The color correction unit 403 performs exposure correction processing on the image on which color correction processing has been performed as described in the second exemplary embodiment using the obtained (R", G", B") values.

Note that, regarding image correction processing, brightness correction processing, color correction processing, and exposure correction processing each may be performed in any order.

As stated above, according to the present exemplary embodiment, the exposure correction parameter calculation unit 601 calculates the exposure correction parameter, based on the brightness value related to the reference area in the image with appropriate exposure. The exposure correction unit 602 corrects the brightness of the entire image to an appropriate value using the exposure correction parameter. Thus, according to the present exemplary embodiment, differences of lighting strength depending on time of day can be suppressed, and it becomes possible to stabilize the accuracy of the brightness correction parameter calculation unit 104 and the color correction parameter calculation unit 402 described above in the first and second exemplary embodiments, thereby the advantageous effect that more improvement of identification accuracy of target objects can be attained.

Fourth Exemplary Embodiment

Figure 10:
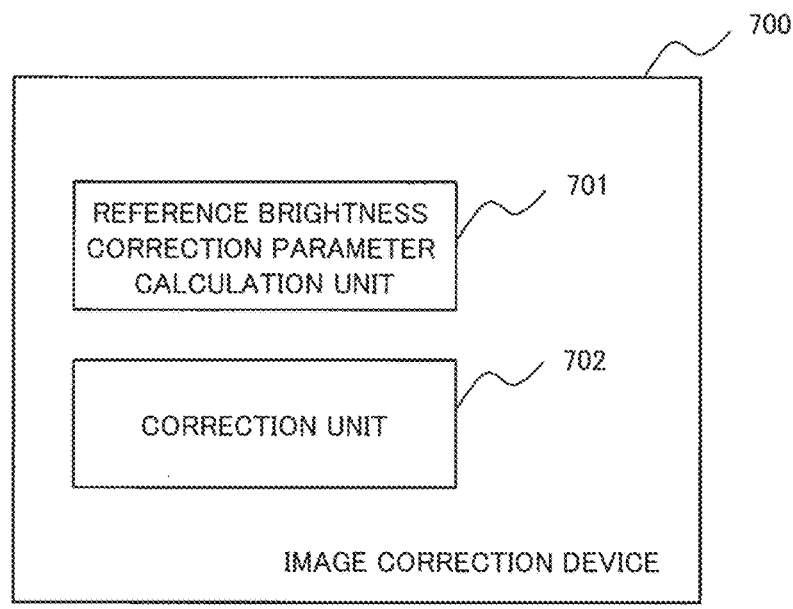
FIG. 10 is a block diagram illustrating a configuration example of an image correction device according to a fourth exemplary embodiment of the present invention.

FIG. 10 is a block diagram illustrating a configuration example of an image correction device 700 according to a fourth exemplary embodiment of the present invention. As illustrated in FIG. 10, the image correction device 700 includes a reference brightness correction parameter calculation unit 701 and a correction unit 702.

The reference brightness correction parameter calculation unit 701 calculates, in a reference image in which a reference object moving in a space that is an image capturing target is captured, the reference brightness correction parameter based on brightness information relating to an area of the reference object and coordinate information specifying a position of the area.

The correction unit 702 corrects the captured image in which the space is captured and the correction-target object is included, based on the reference brightness correction parameter.

The correction unit 702 corresponds to the brightness correction parameter calculation unit 104 and the brightness correction unit 105 in the first exemplary embodiment described above.

As stated above, according to the present exemplary embodiment, the reference brightness correction parameter calculation unit 701 calculates the reference brightness correction parameter associated with the coordinate information, and the correction unit 702 uses the reference brightness correction parameter to correct the captured image, thereby producing an effect that the target object in the captured image can be stably identified, even when the lighting strength differs depending on location in the captured space.

Figure 11:
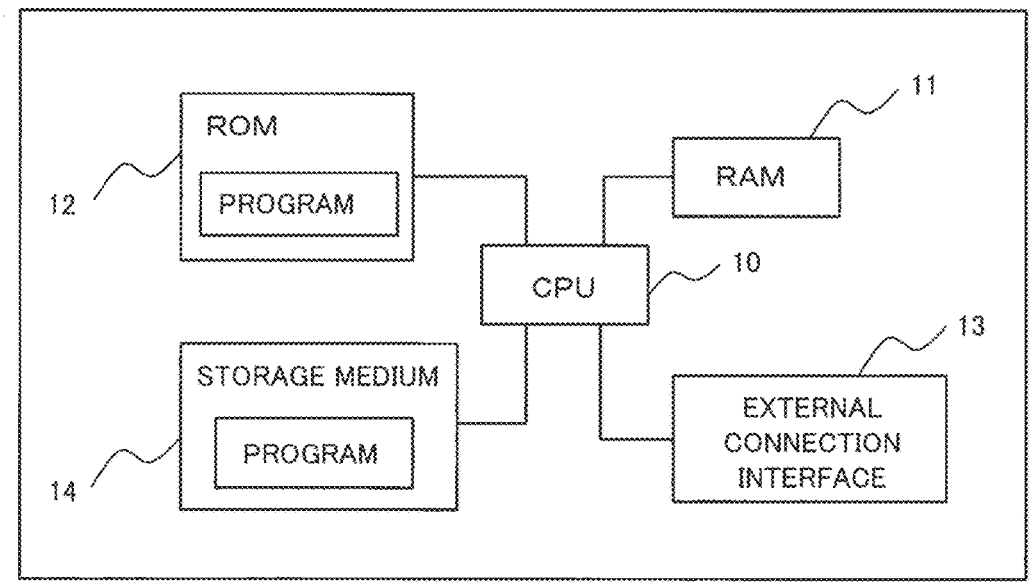
FIG. 11 is a diagram illustrating a hardware configuration example of an information processing device according to the exemplary embodiments of the present invention.

Note that each of the components of the image correction devices illustrated in FIGS. 1, 6, 9, and 10 is implemented in hardware resources exemplified in FIG. 11. In other words, the configuration illustrated in FIG. 11 includes a CPU (Central Processing Unit) 10, a RAM (Random Access Memory) 11, a ROM (Read Only Memory) 12, an external connection interface 13, and a storage medium 14. The CPU 10 controls the overall operation of the image correction device by reading into the RAM 11 and executing various software programs (computer programs) stored in the ROM 12 or the storage medium 14. In other words, in each of the exemplary embodiment above, the CPU 10 refers to the ROM 12 or the storage medium 14 as necessary, and executes software programs which implement each function (each unit) included in the image correction device.

In addition, in each of the exemplary embodiment described above, as an example in which the CPU 10 illustrated in FIG. 11 performs execution, a case was illustrated in which the functions shown in each of the blocks in the image correction devices in FIGS. 1, 6, 9, and 10 are implemented by software programs. However, a part or all of the functions shown in each of the blocks in the image correction devices in FIGS. 1, 6, 9, and 10 may be implemented as hardware.

In addition, the present invention illustrated by using each of the exemplary embodiments as examples will be achieved by supplying to the image correction device the computer programs capable of executing the functions described above, and then by having the CPU 10 read into the RAM 11 and execute the computer programs.

In addition, the supplied computer programs may be stored in readable/writable memory (temporary storage media) or a computer-readable storage device such as a hard disk device. Moreover, in such cases as these, the present invention can be understood to include code representing the computer programs, or storage media in which the computer programs have been stored.

While the present invention has been described with reference to exemplary embodiments thereof, the present invention is not limited to these exemplary embodiments. The constitution and details of the present invention can be subjected to various modifications which can be understood by those skilled in the art, without departing from the scope of the present invention.

This application is based upon and claims the benefit of priority from Japanese Patent Application No. 2014-067595 filed on Mar. 28, 2014, the entire disclosure of which is incorporated herein.

INDUSTRIAL APPLICABILITY

The present invention can be applied to, for example, a wide-area surveillance system to survey a certain area.

REFERENCE SIGNS LIST

10 CPU
11 RAM
12 ROM
13 External connection interface
14 Storage medium
100, 400, 600, 700 Image correction device
101 Reference brightness correction parameter calculation unit
102 Memory
103 Target object extraction unit
104 Brightness correction parameter calculation unit
105 Brightness correction unit
110 Image capturing unit
401 Reference area designation unit
402 Color correction parameter calculation unit
403 Color correction unit
601 Exposure correction parameter calculation unit
602 Exposure correction unit

What is claimed is:

1. An image correction device comprising:
a memory storing instructions; and
at least one processor configured to process the instructions to implement:
a reference brightness correction parameter calculation unit configured to calculate, in a reference image in which a reference object moving in a space that is an image capturing target is captured, a reference brightness correction parameter based on brightness information relating to an area of the reference object and coordinate information specifying a position of the area, and
a correction unit configured to correct a captured image in which the space is captured and a correction-target object is captured, based on the reference brightness correction parameter,
wherein the reference brightness correction parameter calculation unit is further configured to calculate a ratio between an average brightness value relating to an area of the reference object in one reference image, and an average brightness value relating to an area of the reference object in another reference image, as the reference brightness correction parameter which is to be associated with coordinate information specifying the position of the reference object in the another reference image.

2. The image correction device according to claim 1, wherein
the correction unit is further configured to calculate brightness correction parameter which is to be associated with coordinate information specifying the position of the correction-target object using the reference brightness correction parameter, and correct the captured image based on the brightness correction parameter.

3. The image correction device according to claim 2, wherein
the coordinate information specifying the position of the area represents a first coordinate value in a specific coordinate system,
the coordinate information specifying the position of the correction-target object represents a second coordinate value in the specific coordinate system, and
the correction unit is further configured to calculate the brightness correction parameter by interpolating the reference brightness correction parameter which is associated with a coordinate value specifying near the position to the correction-target object, based on the distance between the coordinate value specifying the position of the correction-target object and the coordinate value specifying near the position to the correction-target object.

4. The image correction device according to claim 1, wherein
the reference brightness correction parameter calculation unit is further configured to calculate respective reference brightness correction parameter for plural reference objects, and calculate the reference brightness correct parameter based on the respective reference brightness correct parameter calculated.

5. The image correction device according to claim 1, wherein the at least one processor is further configured to process the instructions to implement
a color correction parameter calculation unit configured to calculate color correction parameter by estimating lighting colors based on color information related to an achromatic or substantially achromatic reference area designated in the captured image,
wherein the correction unit is further configured to correct the captured image using the color correction parameter.

6. The image correction device according to claim 5, wherein,
when plural reference areas are designated, the color correction parameter calculation unit is further configured to calculate the color correction parameter for each of the reference areas, and
the correction unit is further configured to correct the captured image using a color correction parameter weighted according to the distance from the reference areas to the correction-target object.

7. The image correction device according to claim 5, wherein the at least one processor is further configured to process the instructions to implement
an exposure correction parameter calculation unit configured to calculate an exposure correction parameter using brightness information related to a reference area designated in a specific captured image, and brightness information related to a reference area designated in the captured image containing the correction-target object,
wherein the correction unit is further configured to correct the captured image using the exposure correction parameter.

8. An image correction method comprising:
calculating, in a reference image in which a reference object moving in a space that is an image capturing target is captured, a reference brightness correction parameter based on brightness information relating to an area of the reference object and coordinate information specifying a position of the area, and
correcting a captured image in which the space is captured and a correction-target object is included, based on the reference brightness correction parameter,
wherein the calculating the reference brightness correction parameter includes calculating a ratio between an average brightness value relating to an area of the reference object in one reference image, and an average brightness value relating to an area of the reference object in another reference image, as the reference brightness correction parameter which is to be associated with coordinate information specifying the position of the reference object in the another reference image.

9. A non-transitory computer readable storage medium storing a computer program for causing a computer to execute:
a process of calculating, in a reference image in which a reference object moving in a space that is an image capturing target is captured, a reference brightness correction parameter based on brightness information relating to an area of the reference object and coordinate information specifying a position of the area, and
a process of correcting a captured image in which the space is captured and a correction-target object is included, based on the reference brightness correction parameter,
wherein the process of calculating the reference brightness correction parameter includes calculating a ratio between an average brightness value relating to an area of the reference object in one reference image, and an average brightness value relating to an area of the reference object in another reference image, as the reference brightness correction parameter which is to be associated with coordinate information specifying the position of the reference object in the another reference image.

* * * * *